United States Patent [19]

Hayashi

[11] 4,009,101
[45] Feb. 22, 1977

[54] RECYCLE TREATMENT OF WASTE WATER FROM NICKEL PLATING

[75] Inventor: Toshio Hayashi, Inuyama, Japan

[73] Assignee: Kayabakogyo-Kabushiki-Kaisha, Tokyo, Japan

[22] Filed: Sept. 15, 1975

[21] Appl. No.: 613,086

Related U.S. Application Data

[63] Continuation of Ser. No. 403,768, Oct. 5, 1973, abandoned.

[30] Foreign Application Priority Data

Mar. 29, 1973 Japan .............................. 48-35992
Mar. 29, 1973 Japan .............................. 48-35995

[52] U.S. Cl. .................................. 210/28; 210/32; 210/38 B; 210/45; 210/60; 75/101 BE; 75/119; 423/139; 423/145

[51] Int. Cl.² .................................. B01D 15/04

[58] Field of Search .................. 210/28, 32, 24, 34, 210/38, 45, 47, 49, 42, 50, 59, 60; 75/119, 101 BE; 423/139, 140, 145, 144

[56] References Cited

UNITED STATES PATENTS

| | | | |
|---|---|---|---|
| 3,342,730 | 9/1967 | Mihara et al. | 210/32 |
| 3,493,498 | 2/1970 | Abrams et al. | 210/32 |
| 3,575,854 | 4/1971 | Richards | 210/50 |
| 3,630,892 | 12/1971 | Hirs et al. | 75/119 |
| 3,658,470 | 4/1972 | Zievers et al. | 210/38 |
| 3,725,259 | 4/1973 | De Pree | 210/38 |
| 3,800,024 | 3/1974 | Forsell et al. | 210/65 |

*Primary Examiner*—Charles N. Hart
*Assistant Examiner*—Benoit Castel
*Attorney, Agent, or Firm*—Saul Jecies

[57] ABSTRACT

A method for the recycle treatment of nickel plating waste water, in order to efficiently recover the nickel components from waste water which has been used for the washing of nickel plated products in a form re-usable as a nickel plating solution as such, wherein the nickel plating waste water is mixed with an aqueous alkaline component so as to remove, by precipitation in the form of hydroxides, contaminating metal ions other than nickel; the filtrate so obtained is treated through an ion exchange process so as to obtain an aqueous solution of nickel salts containing excess free sulfuric acid, a portion of which is then treated with alkali so as to precipitate nickel hydroxide which is separated in the form of nickel hydroxide through filtration by means of a centrifuge; the nickel hydroxide so obtained is then added to the rest of the aqueous nickel salt solution for neutralization with the free sulfuric acid contained therein to form nickel sulfate; and the free sulfuric acid is then removed so as to obtain a highly concentrated nickel sulfate solution.

8 Claims, 4 Drawing Figures

RECYCLE TREATMENT OF WASTE WATER FROM NICKEL PLATING

This is a continuation application of application Ser. No. 403,768 filed Oct. 5, 1973 now abandoned.

BACKGROUND OF THE INVENTION

This invention relates to a method for the recycle treatment of nickel plating waste water by means of ion exchange resins.

Recycle treatment of nickel plating waste water by means of ion exchange resins has been previously known. Thus, in the processes practiced to date, nickel plating waste water is allowed to flow over cation resins so as to adsorb nickel ions, and when the cation resins become saturated, the nickel ions adsorbed on the resins is eluted by passing through mineral acids, particularly sulfuric acid, so as to regenerate the said cation resins and, at the same time, to recover nickel salt solutions; in these cases, due to the presence of an excessive amount of sulfuric acid, the eluted solutions, namely the nickel salt solutions, cannot be re-used as a nickel plating solution as such, and therefore, they are further treated over anion resins to remove the excessive acid by adsorption so as to recover reusable solutions.

However, in the course of removing the acid, by means of treatment with anion resins, from the solution eluted from the said cation resins, the nickel ion concentration in the solution drops by about 20% and thus a solution with a desired concentration cannot be recovered; furthermore, a considerable amount of nickel is present in the wash water and has to be removed from the washings of the said anion resins after adsorption by passing the wash water through cation resin beds, thus causing an increased load on the cation resins, and in addition, the amount of alkali required for the regeneration of anion resins is several times greater than the theoretical, thus causing increased secondary pollution of the treatment water, to mention some of the drawbacks.

SUMMARY OF THE INVENTION

In the light of the above drawbacks, the purpose of this invention is to offer a highly efficient method for the recycle treatment of nickel plating waste water through elimination of the said drawbacks. In the present invention, nickel plating waste water is treated with cation resins so as to adsorb the nickel ions, which are eluted by sulfuric acid to obtain an aqueous nickel salt solution containing excess sulfuric acid; a portion of this eluted solution is mixed with an alkali to convert the nickel contained therein into nickel hydroxide for removal by filtration, and the nickel hydroxide so obtained is added to the rest of the said eluted solution to react with the free sulfuric acid contained therein so as to form a highly concentrated nickel sulfate solution, while the free sulfuric acid concentration is reduced. In other words, the solution eluted from the cation resins, which had adsorbed nickel ions, is divided into two portions. The nickel component in one portion is recovered in the form of nickel hydroxide through chemical treatment, and the nickel hydroxide so obtained is added to the rest of the eluted solution so as to neutralize the free sulfuric acid, and thus, as a characteristic feature of this invention, a highly concentrated nickel salt solution is obtained.

The above and other purposes, characteristic features, and merits of this invention will be fully understood based on the following examples in the light of the attached figures.

DESCRIPTION OF THE PREFERRED EMBODIMENT

Figure 1:
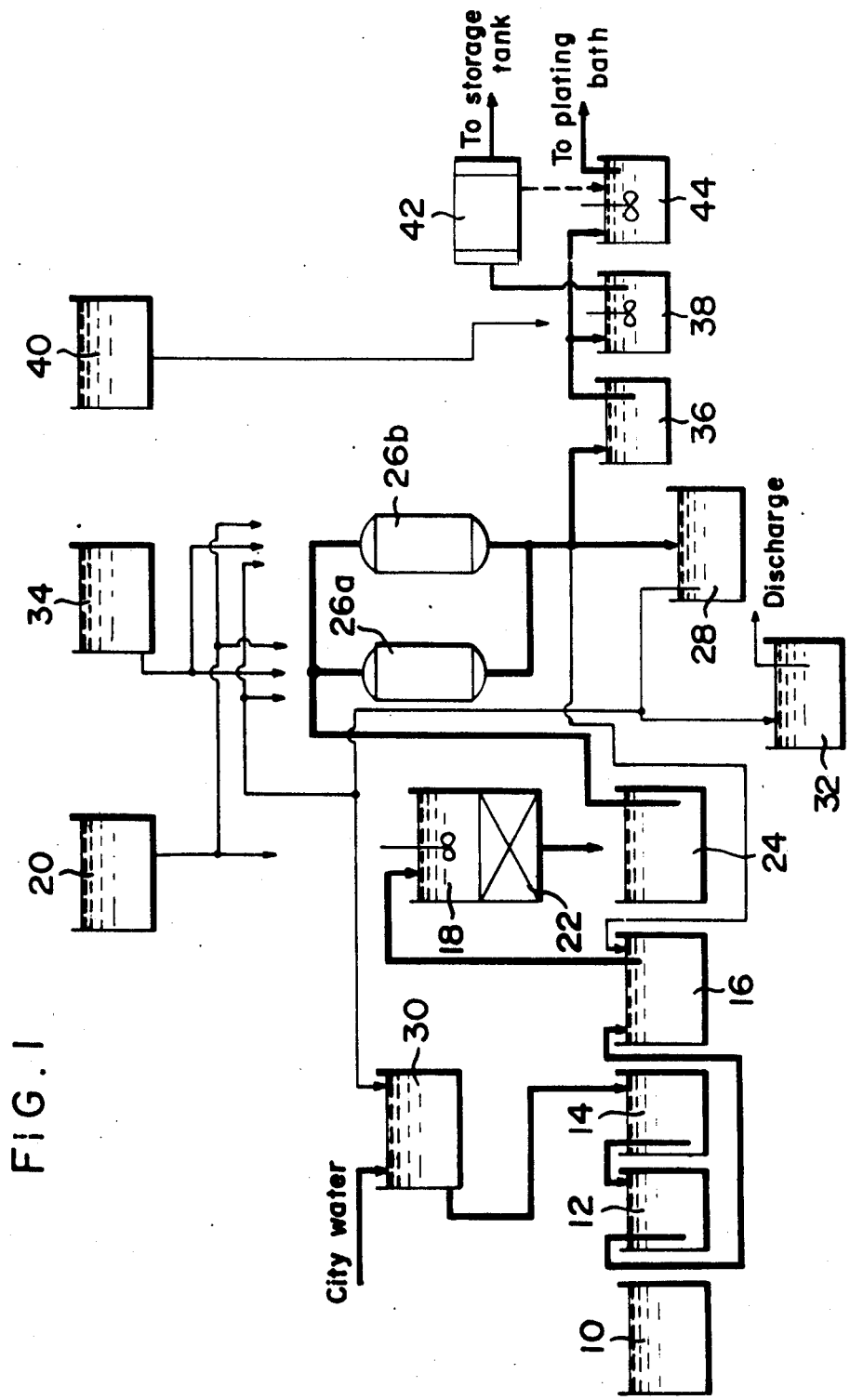
FIG. 1 is a process flow diagram for the recycle treatment by the present invention of nickel plating waste water.

FIG. 1 schematically illustrates the process of recycle treatment of nickel plating waste water according to the present invention. Thus, the products nickel plated in the plating bath 10 are washed first in the first washing bath 12 and then in the second washing bath 14. The wash water used for the washing of the nickel plated products is first supplied into the second washing bath 14, the wash water enriched with nickel salts in the second washing bath 14 is transferred into the first washing bath 12, and the wash water further enriched with nickel salts in the first washing bath 12 is sent to the storage tank 16 for storage. In general, the nickel plating waste water in the storage tank 16 has an acidity of pH 3.5–4.5.

The nickel plating waste water stored in the said storage tank 16 is transferred into the adjustment tank 18, where aqueous sodium hydroxide supplied from the sodium hydroxide tank 20 is added for adjustment to make the pH of the solution about 7.5 so as to precipitate out the metallic components other than nickel, such as iron and copper, etc., in the form of hydroxides, and the resultant mixture is filtered through the filter 22 installed below the adjustment tank 18 to obtain the filtrate, which is then passed to the filtrate tank 24.

Then, the filtrate in the filtrate tank 24 as such is allowed to pass through adsorption towers 26a and 26b which are packed with cation resins so as to adsorb nickel ions, and the treated water eluted from these adsorption towers 26a and 26b is stored in the first water recovery tank 28. Through this treatment, the treated water stored in the first water recovery tank 28 becomes innocuous, and thus it may be used again as wash water by admitting it into the second water recovery tank 30 or it may be discarded after adjustment of the pH in the pH adjustment tank 32. When the adsorption capacity of the cation resins in the said adsorption towers 26a and 26b has reached saturation after repeating such treatments, the flow of filtrate is stopped, and the adsorption towers 26a and 26b are subjected to:

1. Purging: First, air is blown through so as to purge filtrate remaining among the cation resin particles.
2. Pre-washing: Then about 20 volumes of water per volume of resins is used for upward and downward washing of the cation resins. The treated water in the said first water recovery tank 28 is utilized as wash water for this treatment.

3. Purging: Air is again blown through so as to purge wash water remaining among the resin particles, and the said purged filtrate as well as the said purged wash water is returned to the said storage tank 16.

4. Reagent injection: An equivalent volume of aqueous sulfuric acid from the sulfuric acid tank 34 is introduced per volume of the resin so as to effect desorption of the nickel ions and regeneration of the resins, and is eluted in the form of a nickel sulfate solution.

5. Purging: Air is then blown in so as to purge the nickel sulfate solution remaining among the resin particles, and all of these solutions are sent to the primary solution recovery tank 36 for storage.

Through the treatments described above, the nickel ions adsorbed over the cation resins are removed in the form of a nickel sulfate solution and, at the same time, the adsorption towers 26a and 26b are regenerated. In this case, it is recommended to regenerate one of the adsorption towers 26a and 26b while the other is being used for adsorption, so as to make continuous operation possible.

Figure 2:
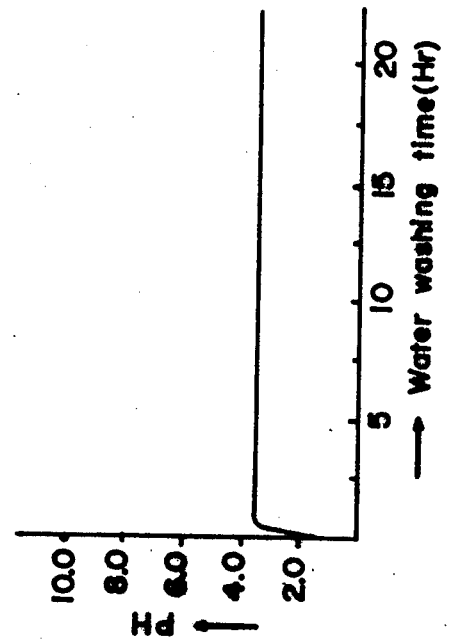
FIG. 2 is a graph illustrating the changes in the resin bed effluent pH versus the volume of water during the course of washing after elution of nickel ions from the cation resins.

For the said adsorption of nickel ions by means of cation resins, a method using H type cation resins and one using Na type cation resins are available, and each of them has its own advantages and disadvantages. In general, the adsorption efficiency of cation exchange resins of this kind is high on the alkaline side and decreases on the acid side; in this respect, the former method using H type cation resins has the disadvantage that the adsorption efficiency cannot be increased above a certain level, as the resins are kept acidic after the desorption of nickel ions by sulfuric acid. Thus, desorption and regeneration of H type cation resins is effected, after elution of the adsorbed ions with the aid of mineral acids such as sulfuric acid, by washing out the remaining acidic components through upward and downward after-washing using water, as in the case of pre-washing; in this case, as shown in FIG. 2, through the pH increases to about 3.5 in the early stage of water-washing, the pH value remains constant afterwards even with continued water-washing, and thus the pH value of H type cation resins cannot be made alkaline. On the other hand, though the latter method using Na type cation resins has a high adsorption efficiency as compared with the former method using H type cation resins, the Na type cation resins are converted into H type when the adsorbed ions are eluted using mineral acids such as sulfuric acid; thus the resins have to be subjected to upward and downward water washing followed by purging before they are converted back into the Na type for regeneration, by treatment with aqueous sodium hydroxide, by purging, and by after-washing, with the shortcomings that the regeneration processes are complex and also time-consuming and that, due to the possible inclusion of excess sodium ions in the eluted solution, their removal is necessary before recycling as a plating solution.

The present inventors have therefore invented the following procedures: H type cation resins which have adsorbed nickel ions are eluted with sulfuric acid, washed by passing to a volume of water about 5 times that of the resins so as to remove the nickel remaining in the resin bed, quickly treated with aqueous sodium hydroxide using the solution supplied from the said sodium hydroxide adjustment tank 20 so as to neutralize the acidic components remaining in the resin bed and to bring the pH of the bed to about pH 12 (alkaline), and then washed by passing one volume of water per volume of the resins upwardly with stirring so as to remove the excess alkali; resins thus regenerated are again used for the adsorption of nickel ions from nickel plating waste water.

EXAMPLE

After treatment by means of the adjustment tank and the filter, nickel plating waste water containing nickel ions at a level of 500 ppm was allowed to pass through the adsorption tower packed with 100 ml H type cation resins at a speed of 3 l./h. The nickel ion concentration in the effluent was below 0.2 ppm. When the solution was allowed to pass through for about 2 h, nickel ions started to appear and their concentration in the effluent exceeded 2 ppm; supply of the solution was then stopped, and the resins were subjected to purging, pre-washing, and purging, and were treated by passing through 100 ml sulfuric acid of 150 g/l. concentration over a period of 20 min. in order to desorb and to recover the nickel ions adsorbed over the resins in the form of nickel sulfate. After purging, about 500 ml water was allowed to pass through this adsorption tower so as to remove the remaining nickel components and to adjust the pH value to 2.5. 100 ml of aqueous sodium hydroxide of 60 – 100 g/l. concentration was then allowed to pass through in the direction of flow of the process to bring the pH to 12; 100 ml of water was allowed to pass through in the direction against the flow of the process in order to wash the resins under stirring so as to complete the regeneration by bringing the pH value down to 11.5; nickel plating waste water was then allowed to pass through so as to repeat the adsorption in the next cycle.

Figure 3:
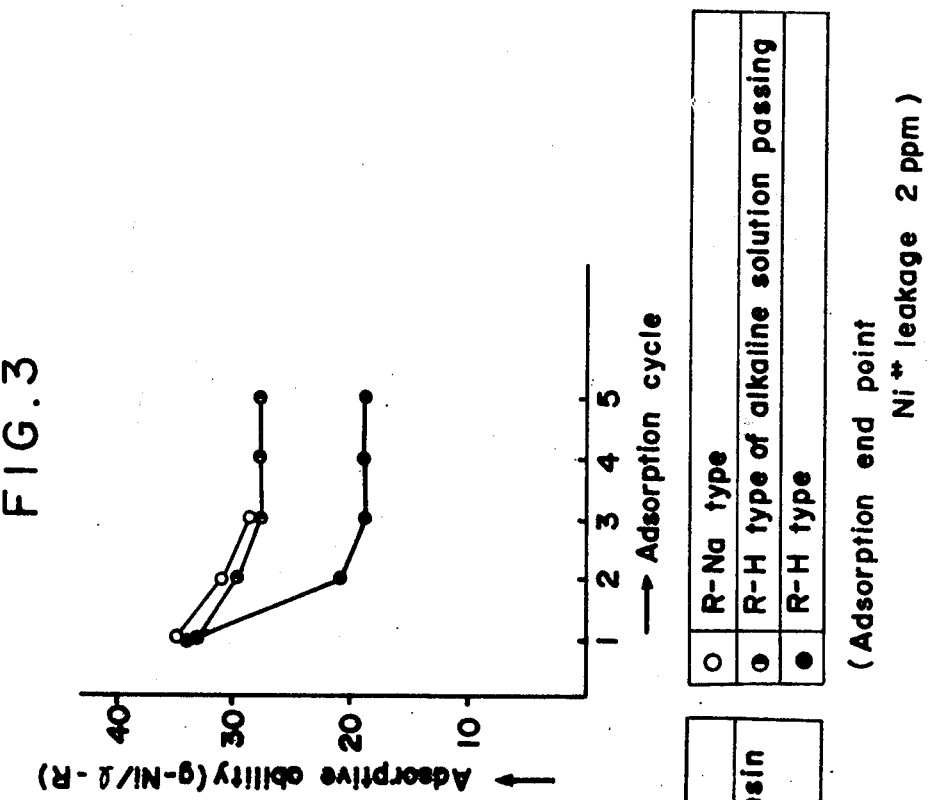
FIG. 3 is a graph illustrating the nickel adsorption ability of H type cation resins when passing through alkaline solutions versus that at Na type and H type cation resins.

In each of these cycles, the adsorption efficiency of the resins calculated on the basic of nickel leaked into the effluents was as shown in FIG. 3. In FIG. 3, the results on the adsorption efficiencies obtained using Na type and H type cation resins as such are also presented. The conditions for the adsorption experiments using these Na type and H type cation resins were as follows:

| Ion exchange resins | 100 ml Na type cation resins |
|---|---|
| Rate of absorption | 3 l./h |
| Regeneration reagent | 100 ml aqueous sulfuric acid of 150 g/l. concentration |
| ibid | 100 ml aqueous sodium hydroxide of 150 g/l. concentration |
| Rate of regeneration | 0.3 l./h |
| Adsorption end point | 2 ppm nickel ion leakage |

| Ion exchange resins | 100 ml H type cation resins |
|---|---|
| Rate of absorption | 3 l./h |
| Regeneration reagent | 100 ml aqueous sulfuric acid of 150 g/l. concentration |
| Rate of regeneration | 0.3 l./h |
| Adsorption end point | 2 ppm nickel ion leakage |

The results described above indicate that, using the regeneration method for H type cation resins invented by the present inventors, wherein alkaline water is passed through the resins the resins neutralized with the aid of aqueous sodium hydroxide are kept in the form of H type while the pH of the resin bed is kept alkaline at a pH value of about 12, and further, that, though the resins are then washed with water while stirrings to the removal of excess alkali, by using one volume of wash water per volume of resins in this treatment, the pH value of the resin bed is maintained on the alkaline side at about pH 11.5, not being rendered acidic. As a result, the adsorption of nickel is always effected in the alkaline range, thus improving the adsorption capacity, by 50% as compared with the conventional method using H type cation resins and which is conducted in an acidic range at about pH 3.5, in other words, the capacity is increased to a level comparable with that of Na type cation resins, and yet the regeneration treatment of the resins, as compared with the case using Na type cation resins, is extremely simple and can be completed in a very short time, and furthermore, the amount of sodium ions contaminating the eluted solution can be kept at an extremely low level so as not to interfere with recycling as a nickel plating solution.

Thus, the eluted solution stored in the said primary solution recovery tank 36 becomes a nickel sulfate solution containing nickel ions plus free sulfuric acid plus a very small amount of sodium. A portion of this eluted solution in the primary solution recovery tank 36 is then transferred into the reaction tank 38 for treatment with aqueous sodium hydroxide supplied from the sodium hydroxide tank 40 in order to precipitate the nickel ions in the form of hydroxide, which is to be removed by filtration through the filter press 42. The filtrate is again returned to the storage tank 16, whereas the filter press is water-washed in order to recover the nickel hydroxide. On the other hand, the rest of the eluted solution in the primary solution recovery tank 36 is sent to the secondary solution recovery tank 44 for mixing with the nickel hydroxide separated by filtration through the said filter press 42, the nickel hydroxide is allowed to react with the excess free sulfuric acid contained in the eluted solution so as to reduce the amount of free sulfuric acid by the formation of nickel sulfate; and the resulting nickel salts solution of desired concentration is recycled back into the plating bath 10 for re-use as a plating solution.

Example

| | | |
|---|---|---|
| $Ni^{++}$ | 100 | ppm |
| Fe components | 1.3 | ppm |
| Cu components | 1.1 | ppm |
| pH | 4.5 | |

The nickel plating waste water with the composition shown in the above table was introduced into the adjustment tank, treated with dilute aqueous sodium hydroxide to adjust the pH to 7.5, and the mixture was filtered through the filter to obtain a filtrate with the following composition.

| | | |
|---|---|---|
| $Ni^{++}$ | 100 | ppm |
| Fe components | Trace | |
| Cu components | 0.04 | ppm |
| pH | 7.5 | |

Thus, by this treatment, iron and copper components were eliminated almost completely, whereas the nickel component remained in the solution.

The filtrate is then allowed to pass through the adsorption tower havings 100 ml H type cation resins at a speed of 3 l/h. When the nickel ion leakage into the effluent from the adsorption tower reached 50 ppm, the supply into the said adsorption tower was stopped and the flow was switched into the stand-by adsorption tower. The saturated adsorption tower was water-washed, treated with aqueous sulfuric acid of 150 g/l. concentration for the removal of nickel ions adsorbed over the resins, and further, the resins were regenerated according to the method described before wherein an alkaline solution is passed through the resins. The volume of the solution eluted from this adsorption tower was 200 l. and the composition was as follows,

| | |
|---|---|
| $NiSO_4 \cdot 6H_2O$ | 139.1 g/l. |
| $Ni^{++}$ | 30.9 g/l. |
| Free $H_2SO_4$ | 74.7 g/l. |
| $Na^-$ | 1.15 g/l. |
| pH | 0 |

A 100 l. portion of this eluted solution was then sent to the reaction tank and mixed with 80 l. of aqueous sodium hydroxide of 150 g/l. concentration so as to adjust the pH to 10 for the formation of nickel hydroxide. The nickel hydroxide precipitates so formed were separated by filtration in the filter press, washed with water, and recovered. The nickel concentration in the wash water was found to be 0.64 mg/l. On the other hand, the 100 remaining liters on the eluted solution was transferred into the secondary solution recovery tank, and mixed with the recovered nickel hydroxide as described before for the neutralization of free sulfuric acid in the eluted solution, so as to obtain 125 l. of recovered solution with the following composition.

| | |
|---|---|
| $NiSO_4 \cdot 6H_2O$ | 219 g/l. |
| Ni components | 48.6 g/l. |
| Free $H_2SO_4$ | 38.0 g/l. |
| Na components | 1.5 g/l. |
| pH | 0.3 |

This recovered solution of nickel salt was satisfactorily used for making up the nickel plating solution.

In order to compare the results with the conventional treatment methods using anion resins, 200 l. of the eluted solution from the said adsorption tower was allowed to pass through a purification tower packed with anion resins to obtain 200 l. of recovered solution with the following composition.

| | |
|---|---|
| $NiSO_4 \cdot 6H_2O$ | 111.0 g/l. |
| Ni components | 24.7 g/l. |
| Free $H_2SO_4$ | 20.0 g/l. |
| Na components | 0.9 g/l. |
| pH | 0.4 |

As is evident from the results shown above, a highly concentrated nickel salt solution is obtained by the method of the present invention as compared with the conventional processes. Further, the loss of nickel in the wash water and the consumption of sodium hydroxide in the process of the present invention were compared with those in the conventional processes, as follows,

| | Method of the present invention | Conventional method |
|---|---|---|
| Loss of $Ni^{++}$ | 96g | 1240g |
| Ratio | 1 | 13 |
| Consumption of sodium hydroxide | 11400g | 37500g |

-continued

| | Method of the present invention | Conventional method |
|---|---|---|
| Ratio | 1 | 3.3 | indicating that the method of the present invention was much superior with respect to nickel recovery as well as reagent consumption.

Figure 4:
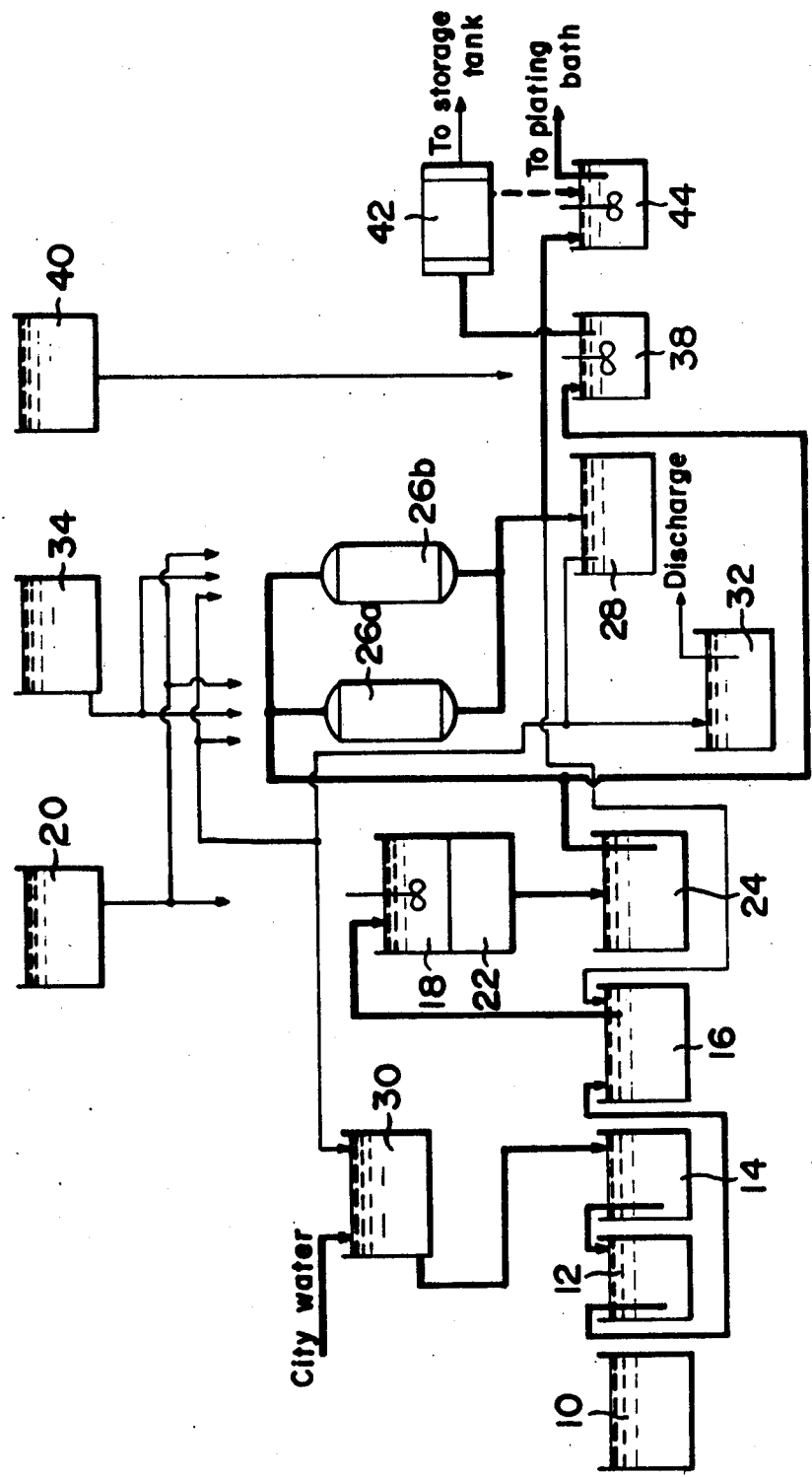
FIG. 4 is a process flow diagram for the recycle treatment of nickel plating waste water relating to another example.

In the example shown in FIG. 4, the nickel plating waste water enriched with nickel salts in storage tank 16 was transferred into the adjustment tank 18 to be mixed with aqueous sodium hydroxide supplied from the sodium hydroxide adjustment tank 20 so as to precipitate out the mtallic components other than nickel in the form of hydroxides, which were then removed by means of the filter 22 installed below, yielding a filtrate which was then sent to the filtrate tank 24, just as in the example shown in FIG. 1 up to this step; however, not all of the filtrate in the filtrate tank 24 was treated in an adsorption tower 26a or 26b packed with H type cation resins. The said filtrate was divided into two portions, only one of which was allowed to pass through an adsorption tower 26a or 26b packed with H type cation resins, and by treatments as described before, the eluted solution was withdrawn into the solution recovery tank 44.

On the other hand, the remaining filtrate was sent to the reaction tank 38 to be mixed with, as in the previous case, aqueous sodium hydroxide supplied from the sodium hydroxide tank 40 so as to precipitate out, through adjustment of the pH of the solution to 10, the nickel components in the form of nickel hydroxide, which was then recovered by filtration by means of the filter press 42 and was added to the said eluted solution in the solution recovery tank 44 so as to react with the free sulfuric acid contained therein, thus removing the free sulfuric acid through the formation of nickel sulfate, and the aqueous nickel salt solution so obtained, with a desired concentration, was returned to the plating bath 10 to be re-used as a nickel plating solution.

Example

| $Ni^{++}$ | 250 ppm |
|---|---|
| Fe components | 1.5 ppm |
| Cu components | 1.2 ppm |
| pH | 5.5 |

Nickel plating waste water having the composition shown above was introduced into the adjustment tank for treatment with dilute aqueous sodium hydroxide to adjust the pH value to 8, and the mixture was allowed to pass through the filter to obtain a filtrate of the following composition.

| $Ni^{++}$ | 250 ppm |
|---|---|
| Fe components | Trace |
| Cu components | 0.04 ppm |
| pH | 8 |

The filtrate was then divided into two portions, one of which was allowed to pass through the adsorption tower packed with 100 ml H type cation resins at a speed of 3 l./h. After passing through the solution for 6 h, nickel ion leakage into the effluent from the adsorption tower reached 100 ppm and thus the supply of the solution into the said tower was stopped; after washing with water, the tower was treated with 100 ml sulfuric acid of 150 g/l. concentration in order to desorb the nickel ions, and also was regenerated by the method of passing through an alkaline solution. The eluted solution, with the following composition, from this adsorption tower was sent into the solution recovery tank.

| $Ni^{++}$ | 31 g/l |
|---|---|
| Fe components | 1.4 ppm |
| Cu components | 5.5 ppm |
| Free $H_2SO_4$ | 75 g/l |
| $Na^-$ | 1.15 g/l |
| pH | 0 |

On the other hand, the rest of the filtrate was transferred into the reaction tank for adjustment of the pH to 10 by the addition of aqueous sodium hydroxide so as to effect the formation of nickel hydroxide, and the precipitates so formed were then removed through filtration by means of a filter press, and 6.2 g of nickel hydroxide was recovered. This nickel hydroxide was then added into the said eluted solution in the solution recovery tank in order to neutralize the free sulfuric acid contained therein, and 125 ml of a solution having the following composition was obtained.

| $NiSO_4 . 6H_2O$ | 202 g/l |
|---|---|
| Ni components | 45 g/l |
| Fe components | 2.0 ppm |
| Cu components | 6.1 ppm |
| Free $H_2SO_4$ | 33.5 g/l |

This recovered nickel salt solution was satisfactorily blended into the nickel plating solution as such for recycling.

According to the present method, as illustrated by the above results, the filtrate from which foreign metallic components such as iron and copper, etc. have been removed is divided into two portions, from one of which the nickel is recovered by chemical means, and the other portion only is subjected to treatment in the ion exchange resin tower, thus halving the load imposed upon the ion exchange resin tower; furthermore, the nickel hydroxide recovered by chemical means is added to the solution eluted from the ion exchange resin tower so as to obtain a nickel sulfate solution, thus advantageously providing a highly efficient recycle treatment for nickel plating waste water with relatively high nickel content.

What is claimed is:

1. A method of treating acidic nickel plating waste water for recycling to nickel plating baths, comprising the steps of;

adding an alkaline substance to a body of nickel plating waste water which includes dissolved nickel and other dissolved metallic components which can be precipitated as hydroxides, so as to increase the pH of said body to a level of about 7.5 at which said other metallic components precipitate as hydroxides but at which substantially all of said nickel remains in solution;

separating said waste water from the resulting precipitate;

adsorbing nickel from said waste water subsequent to said separation by contacting said waste water with a cation exchange resin maintained at a pH value of about 11.5.

desorbing adsorbed nickel from said resin by contacting the resin with sulfuric said thereby obtaining an acidic nickel-containing solution;

dividing said solution into a first portion and a second portion; adding an alkali to said first portion to raise the pH value thereof to about 10 for precipitating nickel hydroxide from said first portion;

recovering said nickel hydroxide;

combining at least part of said recovered nickel hydroxide with said second portion of said solution to react with excess parts of said sulfuric acid so as to reduce the amount of free sulfuric acid in said second portion and form a nickel sulfate solution suitable for recycling to nickel plating baths;

and recycling said solution to nickel plating baths.

2. A method as defined in claim 1, wherein said separation and said recovery each comprise filtration.

3. A method as defined in claim 1, said resin comprising an H type cation exchange resin, and said adsorption and desorption respectively comprising passing said waste water and said sulfuric acid over said resin in a predetermined flow direction; and wherein regeneration of said resin is substantially completed subsequent to said desorption by passing a first quantity of water over said resin in said predetermined flow direction so as to remove nickel remaining in said resin, subsequently passing an alkaline solution over said resin in said predetermined flow direction so as to raise the pH value of said resin to about 12, and thereafter passing a second quantity of water over said resin countercurrently to said predetermined flow direction so as to remove excess alkalinity remaining in said resin.

4. A method as defined in claim 3, said first quantity of water having a volume which is less than about 5 times the volume of said resin and said second quantity of water having a volume which approximately equals the volume of said resin; and wherein said resin is stirred during passage of said second quantity of water thereover.

5. A method of treating acidic nickel plating waste water for recycling to nickel plating baths, comprising the steps of;

adding an alkaline substance to a body of nickel plating waste water which includes dissolved nickel and other dissolved metallic components which can be precipitated as hydroxides so as to increase the ph of said body to a level of about 7.5 at which said other metallic components precipitate while substantially all of said nickel remains in solution;

separating the nickel containing waste water from the resulting precipitate;

dividing the nickel containing waste water into a first portion and a second portion subsequent to said separation;

adsorbing nickel from said first portion of said waste water by contacting said first portion of said waste water with a cation exchange resin maintained at a pH value of about 11.5;

desorbing adsorbed nickel from said resin by contacting the resin with sulfuric acid thereby obtaining an acid nickel-containing solution;

treating said second portion with alkali for precipitating nickel hydroxide from said second adding an alkali to said second portion to raise the pH value thereof to about 10 for;

recovering said nickel hydroxide;

combining at least part of said nickel hydroxide with said solution to react with excess sulfuric acid in said solution so as to reduce the amount of free sulfuric acid therein and form a nickel sulfate solution suitable for recycling to nickel plating baths;

and recycling said solution to nickel plating baths.

6. A method as defined in claim 5, wherein said separation and said recovery each comprise filtration.

7. A method as defined in claim 5, said resin comprising an H type resin, and said adsorption and desorption respectively comprising passing said first portion of said waste water and said sulfuric acid over said resin in a predetermined flow direction; and wherein regeneration of said resin is substantially completed subsequent to said desorption by passing a first quantity of water over said resin in said predetermined flow direction so as to remove nickel remaining in said resin, subsequently passing an alkaline solution over said resin in said predetermined flow direction so as to raise the pH value of said resin to about 12, and thereafter passing a second quantity of water over said resin countercurrently to said predetermined flow direction so as to remove excess alkalinity remaining in said resin.

8. A method as defined in claim 7, said first quantity of water having a volume which is less than about 5 times the volume of said resin and said second quantity of water having a volume which approximately equals the volume of said resin; and wherein said resin is stirred during passage of said second quantity of water thereover.

* * * * *